Nov. 30, 1965  J. F. DELAHUNT ET AL  3,220,887
FUEL CELL ELECTROLYTE
Filed Sept. 29, 1961
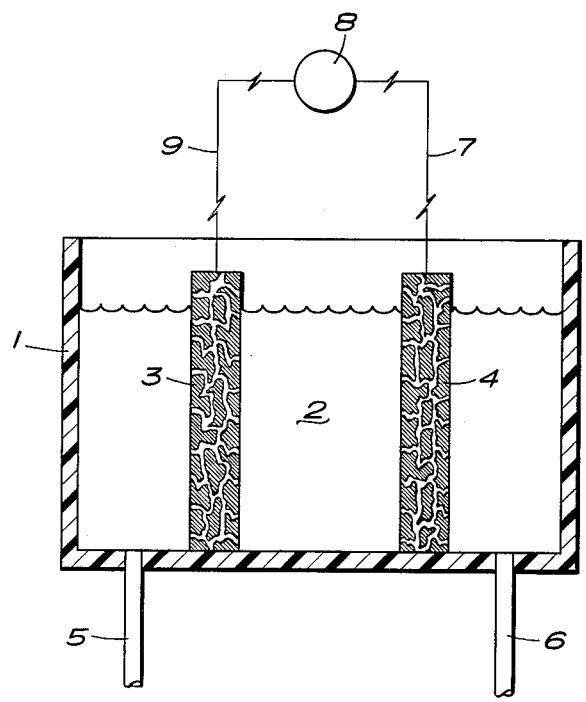
JOHN F. DELAHUNT
JOHN V. CLARKE, JR.  INVENTORS
BY  *Henry Berk*
PATENT ATTORNEY

3,220,887
FUEL CELL ELECTROLYTE

John F. Delahunt, Florham Park, and John V. Clarke, Jr., Cranford, N.J., assignors to Esso Research and Engineering Company, a corporation of Delaware
Filed Sept. 29, 1961, Ser. No. 141,610
3 Claims. (Cl. 136—154)

This invention relates to new and useful improvements in the direct production of electrical energy from fluid combustible fuels such as hydrogen and organic compounds. In particular, this invention relates to fuel cells employing a phosphoric acid comprising electrolyte and to methods for improving the operation of such cells.

Fuel cells employing acid electrolytes are known in the art. The term "fuel cell" is used herein and in the art to denote a device or apparatus wherein hydrogen or a fluid organic compound of lower oxidation state than carbon dioxide is oxidized electrochemically with resulting net production of electrical energy. The over-all fuel cell reaction is the sum of two essentially independent half-cell reactions. At the anode, a combustible fluid fuel, such as hydrogen, carbon monoxide, or a carbon and hydrogen comprising compound, is oxidized with a release of electrons to such electrode. At the cathode, oxygen or other oxidizing gas continuously admitted from an outside source accepts electrons and is reduced. The electrical circuit is completed by ion transfer between electrodes through the electrolyte and electron transfer between electrode by conductors positioned outside such electrolyte.

In the early development of low temperature fuel cells much of the work was carried out with basic electrolytes. where acids have been employed the electrolyte has usually consisted of aqueous solutions of sulfuric acid.

It has now been discovered that an effective fuel cell operation or process can be carried out employing an electrolyte comprising in combination phosphoric acid and an alkali metal acid sulfate. Such sulfates otherwise referred to as bisulfates or monohydrogen sulfates have the formula $$XHSO_4$$

wherein X is a monovalent alkali metal, such as sodium, potassium or lithium. Such electrolytes have a specific resistance comparable to that of a sulfuric acid electrolyte and are less corrosive than sulfuric acid solutions of the concentration suitable for use in fuel cells.

Reference is made to the attached drawing in order to more particularly describe applicants' invention. The drawing is not to be construed as a limitation upon the scope of the invention as set forth in the appended claims. The drawing is a schematic side view of a typical fuel cell comprising an electrolyte container 1 having an electrolyte 2 therein. Immersed in said electrolyte are anode 3 and cathode 4 connected externally to the cell by electrically conductive wires 9 and 7 through an electrically driven device 8, electrolyte container 1 being fitted with conduit 5 to supply a fluid combustible fuel into dual contact with the electrolyte and the anode and conduit 6 to supply an oxidizing gas into dual contact with the elecrolyte and the cathode.

In accordance with this invention an aqueous electrolyte is employed containing about 1 to 4, preferably 2 to 3 moles $H_3PO_4$ and about 0.7 to 1.5, preferably 0.8 to 1.2 moles of the alkali metal acid sulfate.

The invention will be more fully understood from the following examples.

EXAMPLE 1

The effectiveness of phosphoric acid with regard to the anodic half-cell reaction, i.e. the fuel electrode, was determined in an electrochemical cell both at room temperature, i.e. about 75° F. and at an elevated temperature, i.e. about 130° F. The fuel electrode employed was a platinum black coated stainless steel sheet. Direct electric current was applied to a platinum black coated metal grid which served as the anode. The electrolyte was subjected to electrolysis prior to use in the cell to remove trace contaminants. The fuel employed was methanol admitted directly into solution with the electrolyte in an amount such as to provide a 1 molar methanol concentration. Aqueous sulfuric acid having a concentration of about 0.5 moles/liter was used as a comparison, such being a concentration of $H_2SO_4$ at which the best reaction rates are obtainable. The results of the performance runs made are set forth in the following table:

Table I
FUEL ELECTRODE POLARIZATION*

| Electrolyte Temperature | 75° F. | | 130° F. | |
|---|---|---|---|---|
| Acid Conc., Mols/Liter | 0.5 $H_2SO_4$ | 2.7 $H_3PO_4$ | 0.5 $H_2SO_4$ | 2.7 $H_3PO_4$ |
| Current, Amps./Ft.²: | | | | |
| 2.5 | −.230 | −.229 | −.102 | −.155 |
| 10 | −.260 | −.257 | −.197 | −.191 |
| 90 | −.297 | −.30 | −.236 | −.230 |
| 170 | | | −.245 | −.240 |
| 290 | | | −.250 | −.255 |

*From Standard Calomel Reference Electrode.

EXAMPLE 2

The procedure of Example 1 is repeated but using in lieu of the power driven cathode an oxygen breathing cathode comprising a porous carbon cylinder impregnated with platinum through which oxygen gas is made continuously available to the electrolyte in contact with such cylinder. The performance of Example 1 is duplicated.

EXAMPLE 3

The specific resistance of aqueous phosphoric acid to which various sulfates and phosphates have been added is tested for comparison with the specific resistance of an aqueous solution containing 0.5 mols $H_2SO_4$ and 1 mol of methanol/liter which at 75° F. is about 5.4 ohms-cm. The results of such tests are set forth in the following table:

Table II
SPECIFIC RESISTANCE OHM-CM. AQUEOUS ELECTROLYTE SOLUTION 2.7 MOLAR $H_3PO_4$ AND 1.0 MOLAR METHANOL

| Salt Conc., Mols/Liter | 0 | 0.15 | 0.45 | 0.73 | 1.45 |
|---|---|---|---|---|---|
| Salt: | | | | | |
| $NaH_2PO_4$ | 8.5 | 9.3 | | | |
| $KH_2PO_4$ | 8.7 | 9.3 | 9.8 | | |
| $NaHSO_4$ | 8.6 | 7.6 | 6.4 | 5.7 | 4.3 |

EXAMPLE 4

The effect of $NaHSO_4$ addition to phosphoric acid electrolyte upon the critical fuel electrode performance was then demonstrated in the manner prescribed in Examples 1 and 2.

The results of these performance runs are set forth in the following table:

*Table III*

EFFECT OF BISULFATE ADDITION TO $H_3PO_4$ ON FUEL ELECTRODE PERFORMANCE

| Amount of Salt ($NaHSO_4$) Added, Mols/Liter | Fuel Electrode Polarization U.S. Standard Calomel Reference Current Density, Amps./Ft.$^2$ With Variance of— | | | | |
|---|---|---|---|---|---|
| | 1[a] | 10[a] | 100[a] | 300[b] | Open Circuit |
| 0.0 | −.150 | −.250 | −.290 | −.220 | +.148 |
| 0.73 | −.155 | −.280 | −.330 | −.270 | +.103 |
| 1.45 | −.210 | −.290 | −.340 | −.275 | +.118 |

[a] At 75° F.
[b] At 130° F.

Thus, metal monohydrogen sulfate substantially reduces the specific resistance of a phosphoric acid electrolyte to a specific resistance comparable with a sulfuric acid electrolyte without significantly affecting the polarization at the fuel electrode over a range of power output.

The general requirements of fuel cell design are well known in the art. The cell must include at least two electrodes which in operation assume an opposite polarity. These electrodes must be spaced apart although preferably a very short distance, i.e. not more than ¼ inch and more preferably less than ⅛ inch. The electrodes must be positioned so as to both be in contact with an electrolyte. Transfer means, e.g. tubes or other conduits, must be associated with the cell so as to provide means for continuously supplying a fluid combustible fuel into dual contact with the electrolyte and the anode and an oxidizing gas into dual contact with the electrolyte and the cathode. Conduction means must be associated with the cell for establishing electrical connection between anode and cathode. This may be a simple wire connection with a single cell or more elaborate connections from cell to cell in a multi-cell arrangement in series or parallel. Cell design does not comprise a part of this invention. The electrolytes herein claimed may be used with any cell design suitable for use with an aqueous electrolyte. Catalysts suitable for use at the opposing electrodes are also well known in the art and do not comprise a part of this invention. Those metals which are suitable for use with sulfuric acid electrolytes are also suitable for use with the electrolytes of this invention. The most satisfactory of these being noble metals of Group VIII of the Periodic Table, e.g. platinum, iridium, etc., and other acid resistant metals, such as gold.

The term "fluid combustible fuel" as employed herein shall be confined to liquid or gaseous fuels selected from the group consisting of hydrogen, carbon monoxide, and carbon and hydrogen containing compounds.

The reference herein to the Periodic Table or groups of elements thereof refer to the 1959 edition of the Periodic Table designed by Henry O. Hubbard, revised by William F. Meggers and published by W. M. Welch Mfg. Co., Chicago, Illinois.

What is claimed is:

1. A fuel cell comprising in combination an electrolyte compartment, an aqueous electrolyte in said electrolyte compartment consisting essentially of about 1 to 4 moles $H_3PO_4$ and about 0.7 to 1.5 moles of an alkali metal acid sulfate per liter of electrolyte, an anode in contact with said electrolyte, a cathode spaced apart from said anode and in contact with said electrolyte, transfer means for passing a fluid combustible fuel into dual contact with said anode and said electrolyte, transferring means for passing an oxidizing gas into dual contact with said cathode and said electrolyte, and conduction means establishing electrical connection between said anode and said cathode.

2. A fuel cell in accordance with claim 1 wherein said alkali metal acid sulfate is sodium bisulfate.

3. A fuel cell in accordance with claim 1 wherein said said aqueous electrolyte consists essentially of 2.7 moles of $H_3PO_4$ and 1.45 moles $NaHSO_4$ per liter of electrolyte.

References Cited by the Examiner

UNITED STATES PATENTS

| | | | |
|---|---|---|---|
| 1,433,136 | 10/1922 | Holmes | 136—154.2 |
| 2,472,379 | 6/1949 | Lawson | 136—154 |
| 2,493,579 | 1/1950 | Hammond | 204—140.5 |
| 2,649,766 | 8/1953 | Johnson | 136—154.2 |
| 2,901,522 | 8/1959 | Bopp | 136—86 |
| 2,901,524 | 8/1959 | Gorin | 136—86 |

OTHER REFERENCES

Chemical Abstracts, vol. 35, 1941, column 7805.

Ephraim: Inorganic Chemistry, fourth edition, pages 580–582.

Thorpe's Dictionary of Applied Chemistry, fourth edition, vol. X, page 887.

WINSTON A. DOUGLAS, *Primary Examiner.*

JOHN R. SPECK, JOHN H. MACK, *Examiners.*